United States Patent [19]
Reiger

[11] Patent Number: 5,867,932
[45] Date of Patent: Feb. 9, 1999

[54] TROLLING OUTRIGGER

[76] Inventor: Craig M. Reiger, 6867 Enge Dr., West Bend, Wis. 53095

[21] Appl. No.: 717,916

[22] Filed: Sep. 23, 1996

[51] Int. Cl.⁶ .................................................. A01K 93/00
[52] U.S. Cl. .......................................... 43/43.13; 43/43.1
[58] Field of Search .................................. 43/43.1, 43.13

[56] References Cited

U.S. PATENT DOCUMENTS

| | | | |
|---|---|---|---|
| 270,358 | 1/1883 | Aldrich | 43/43.1 |
| 1,361,602 | 12/1920 | Marks | 43/43.13 |
| 1,606,240 | 11/1926 | Klaserner | 43/43.16 |
| 2,497,356 | 2/1950 | Hagen | 43/43.1 |
| 2,933,848 | 4/1960 | Tollefson | 43/43.13 |
| 3,099,099 | 7/1963 | Cahen et al. | 43/26.2 |
| 3,318,038 | 5/1967 | Delsol | 43/43.13 |
| 3,747,248 | 7/1973 | Baer | 43/43.13 |
| 4,156,320 | 5/1979 | Kammeraad | 43/27.4 |
| 4,763,437 | 8/1988 | Cuda | 43/43.13 |
| 4,825,580 | 5/1989 | Gray | 43/44.9 |
| 4,856,222 | 8/1989 | Hannam | 43/26.1 |
| 5,033,226 | 7/1991 | Jackson | 43/43.12 |
| 5,189,828 | 3/1993 | Summers | 43/43.12 |
| 5,435,094 | 7/1995 | Howard | 43/43.13 |

OTHER PUBLICATIONS

"Boat" Carries Fishline, Popular Mechanics, Sep. 1949, p. 260.

*Primary Examiner*—J. Woodrow Eldred
*Attorney, Agent, or Firm*—Wheeler Kromholz & Manion

[57] ABSTRACT

A trolling outrigger apparatus for trolling a fishing lure from a moving watercraft at a predetermined distance from the watercraft and at a specified depth using a sealed floating hull with a counter-steering rudder, a multiple line release clasps and a variable depth measuring device. The trolling outrigger method provides the benefits of covering a large area while fishing as well as the benefits of fishing at specified and consistent depths within the water.

15 Claims, 3 Drawing Sheets

TROLLING OUTRIGGER

BACKGROUND OF THE INVENTION

The present invention relates generally to the trolling method of fishing from a moving boat or other watercraft, and in particular, to trolling with known fishing lures or live bait. More particularly, this invention relates to trolling a lure or bait off the side or stern of a moving watercraft at a specified depth within the water, and at an appropriate predetermined distance from the watercraft.

Fishing with a lure or live bait using the trolling method involves casting the lure or bait into a lake or river connected to a moving watercraft by means of a thin fishing line which pulls the lure or bait through the water. This pulling motion of the lure through the water causes the lure to engage in commonly used oscillations intended to attract the attention of fish within the water. Trolling while fishing also allows a greater area of the lake or river to be covered than by employing multiple casts of a lure or bait from a stationary watercraft. It is well known that covering a greater area of a lake or river while fishing increases the likelihood of successfully catching a fish, and it can increase the number of fish caught during a given period of time fishing. Indeed, the increased success of fishing while trolling has created various restrictions on its use in state stocked, or smaller bodies of water where local agencies have an interest in closely regulating the fish population.

One known method of casting a fishing line while trolling is to simply extend, by hand, one or more commercially available fishing rods over the water from a moving watercraft. Another known method, used more frequently within the commercial fishing industry, is to use long fiberglass poles called outriggers which extend from various regions of the boat. Fixed outrigger poles are removably secured to the watercraft by placing one end of the pole into a matched aperture on the boat. The opposite end of the pole (extended away from the boat) is then used to hold the fishing line in a stable position away from the boat and above the surface of the water. Outriggers and fishing poles come in a variety of lengths and are composed of a variety of materials to provide different levels of flexibility and resistance to the lure or bait and any fish which are reeled into the boat.

Due to the forward motion of a watercraft while trolling, a fishing line cast from the watercraft will tend to migrate toward the back, or wake, of the watercraft and remain there. However, it is undesirable for a fishing line to remain directly behind the watercraft while trolling because a moving watercraft generally has some means of propeller propulsion, which, in addition to the exhaust from a driving engine, creates a wake or path behind the watercraft. This wake or path directly behind the watercraft is generally significantly turbulent and not conducive to the normal oscillating motion of a fishing lure or live bait. In addition, fish are known to avoid engine exhaust and propeller wakes. Because of this, one primary function of a fishing pole or fixed outrigger while trolling is to control the placement of a fishing line, and therefore the placement of the fishing lure or bait, away from the turbulent thrust of the moving watercraft. In addition, these fishing poles and fixed outriggers can also allow multiple lines to be cast from one watercraft simultaneously without becoming entangled.

Because it is known that different species of fish respond to different water temperatures and weather conditions by occupying different depths within a body of water, it is desirable to position a fishing lure or bait to match the depth for a chosen species of fish. In addition, commercially available electronic graphical "fish finders," employed by many in the sport, allow the depth of a spotted fish, or groupings of fish, to be preciously determined. Knowing the depth of the fish provides the ability to target the "found fish" by trolling a lure or bait at that depth. Therefore, it is desirable to be able to control the depth at which a fishing lure or bait passes through the water while trolling.

The fishing pole and fixed outrigger methods of controlling a fishing line from a trolling watercraft, while effective in removing the lines from the wake of the watercraft, do not allow the depth of the fishing lure or bait to be controlled. This is because as the lure and line travel through the water, the force of the water against the lure and fishing line, cause both to move toward the surface of the water. The faster a watercraft trolls, the greater the tendency of the lure and line to move toward the surface.

The present invention provides a way to obtain the benefits of troll fishing, while allowing control of both the placement of the line away from the wake of the watercraft, and the depth of the lure or bait within the water. The present invention comprises a sealed floating hull to which a fishing line is attached, and which guides itself at a determined distance alongside the trolling watercraft using a weighted device beneath the hull to regulate and maintain the lure depth.

In addition, the present invention also provides a means by which to fish from a stationary pier or dock over the moving waters of a river. The counter force applied by the steering rudder of the present invention provides a stationary platform from which a lure line can be attached without moving down river with the current. In this way, a the repetitive casting generally associated with river fishing can be avoided.

SUMMARY OF THE INVENTION

The present invention comprises a sealed floating hull which is used to guide a fishing line away from a trolling watercraft. The sealed hull utilizes various breakaway clips to secure a fishing line to the hull, and a fishing lure to a guide wire ballast at a specified depth, as the hull passes across the surface of the water. The Trolling Outrigger comprises two embodiments, both using a sealed floating hull to which a section of the fishing line is attached. Both embodiments also use a counter-steering rudder to provide a directional force perpendicular to the forward direction of the watercraft to maintain a preset distance from the side of the watercraft.

The first embodiment comprises a uniformly thick sealed hull with a number of clips used to releasably attach a fishing line to the hull, a line depth measuring device, a steerable rudder, and a spool for holding a length of guide wire.

The second embodiment of the invention comprises a graduated hull which is wider and deeper toward the bow region of the hull. While the second embodiment utilizes the same fishing line control mechanisms as the first embodiment, the deeper bow region of the hull provides enhanced stability for trolling in rougher surface water conditions and at deeper lure depths.

Each embodiment offers significant benefits over existing outrigger art. The present invention can extend a fishing line to greater distances from the trolling watercraft than existing standard fixed pole outriggers or fishing poles. Further, the present invention provides the ability to consistently regulate the depth at which an attached fishing lure or bait is trolled. The present invention can be used in recreational as well as commercial fishing applications with readily available fishing lines and with all fishing lures.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
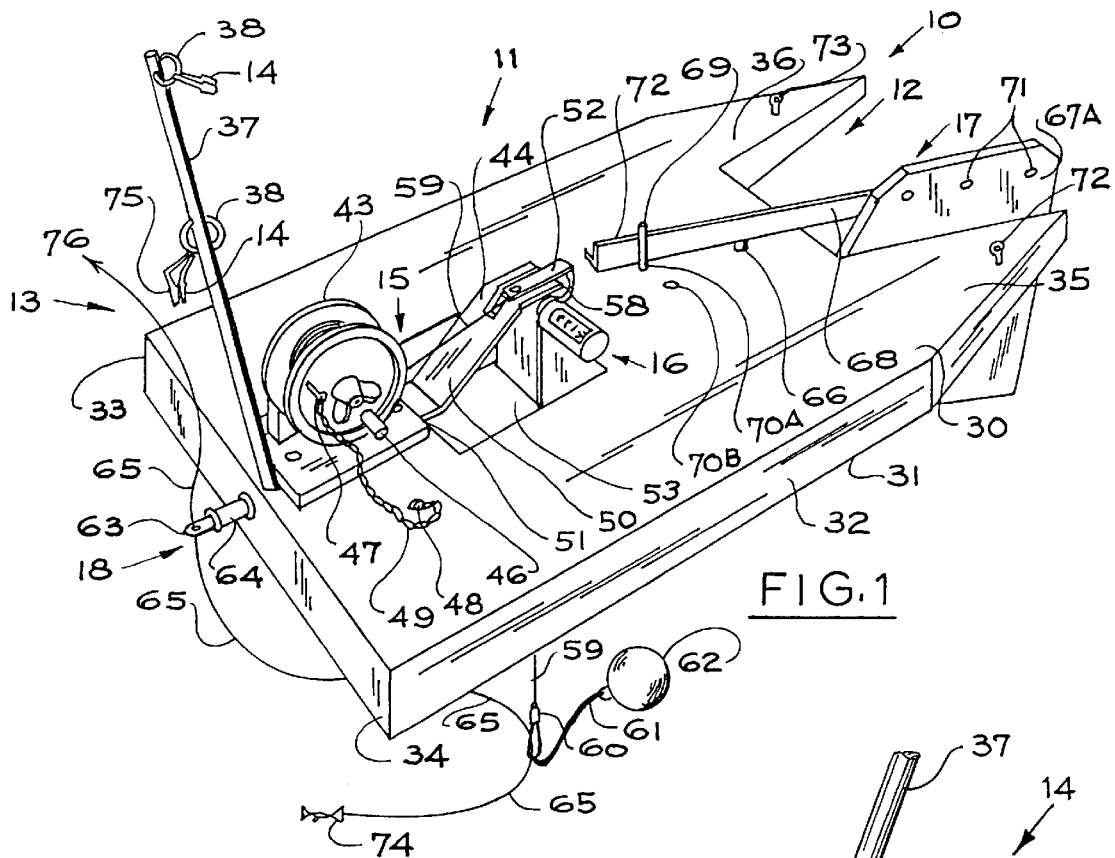
FIG. 1 is a top perspective view of a first embodiment of the trolling outrigger showing a hull, a guide wire measuring device, a guide wire spool, a rudder assembly, an outrigger mast, fishing line clasps, and a guide wire ballast.
Figure 7:
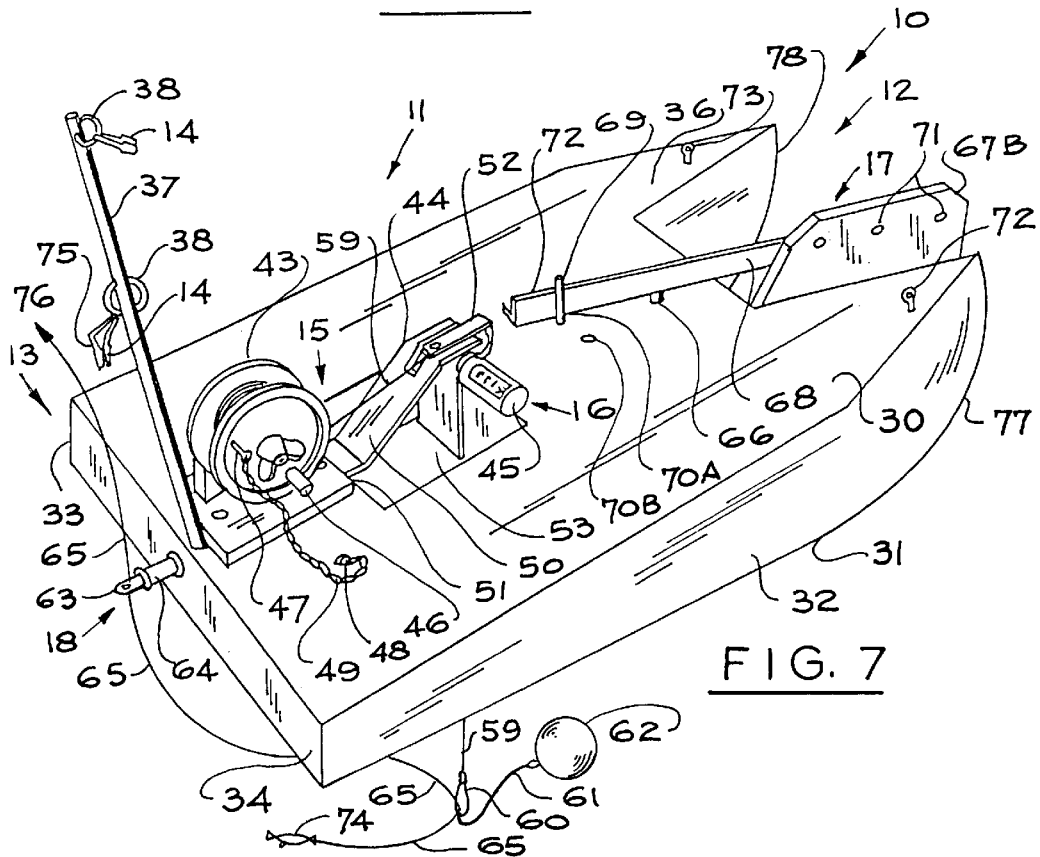
FIG. 7 is a top perspective view of a second embodiment of the trolling outrigger showing the deeper and graduated hull with the same attachments as described in FIG. 1.

With reference to FIGS. 1 and 7, it will be noted the trolling outrigger 10 of this invention comprises a permanently sealed hull 11 made up of a top surface 30, a bottom surface 31, a right side section 32, a left side section 33, and a stern section 34. The hull 11 is further characterized by having a forward bow region 12 and a rearward stern region 13. The forward bow region 12 is split into a right pontoon 35 and a left pontoon 36. The preferred construction and material of the sealed hull 11 is a Styrofoam form covered by fiberglass designed to have an overall density less than water, but it is to be understood that a variety of materials may be used to accomplish the same desired function.

Figure 3:
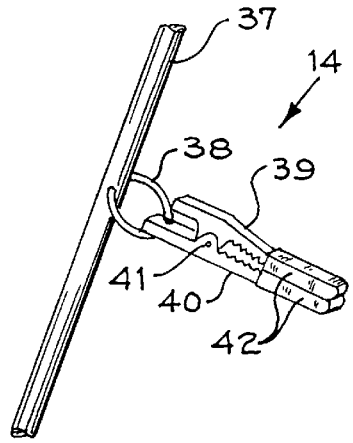
FIG. 3 is an enlarged perspective view of the outrigger mast showing the mast and a fishing line release clasp.

With additional reference to FIGS. 1 and 7, affixed to the reward stern region 13 of the top surface 30 of the hull 11 is a mast 37 with multiple line release clasps 14 attached to the mast 37 by means of an o-ring 38. Shown in greater detail in FIG. 3, the line release clasp 14 is comprised of a first arm 39 and a second arm 40 hinged together at position 41 with a coil spring (not shown) housed between the first arm 39 and second arm 40 providing a static force between the two calipers 42. Also shown in FIG. 3 is the mast 37 and an attached o-ring 38.

Figure 4:
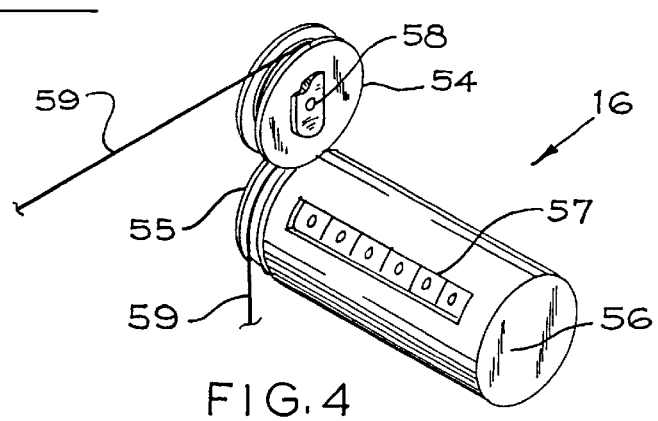
FIG. 4 is an enlarged perspective view of the guide wire measuring device showing the guide wire positioned therethrough.
Figure 5:
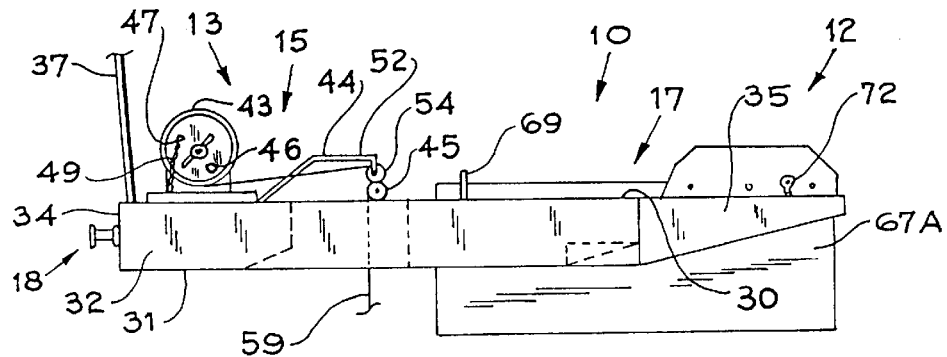
FIG. 5 is a side elevational view of a first embodiment of the trolling outrigger showing the rudder assemble pivotally attached to the forward bow section of the hull.
Figure 6:
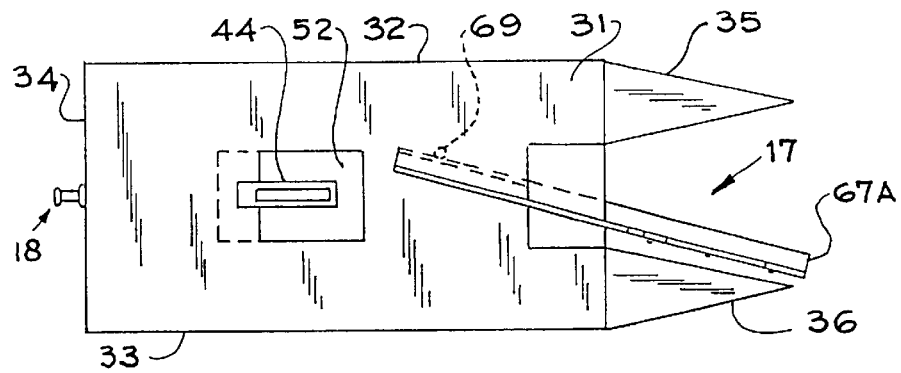
FIG. 6 is a bottom plan view of the trolling outrigger showing the off center opening for the guide wire.

Referring again generally to FIGS. 1 and 5 through 9, also affixed to the reward stern region 13 of the top surface 30 of the hull 11 is a guide wire assembly 15. The guide wire assembly comprises a guide wire spool 43, a guide wire boom 44, and a guide wire measuring device 16. Attached to the guide wire spool 43 is a spool crank handle 46, and releasably inserted in the guide wire spool 43 is a pin 47. The pin 47 restricts rotation of the guide wire spool 43 when slidably received within the guide wire spool and allows the guide wire spool 43 to rotate when removed. The releasable pin 47 is permanently attached at one end to the top surface 30 of the hull 11 at position 48 by means of a chain 49 or similar item. The lower end 50 of the guide wire boom 44 is affixed to the hull 11 at the base of the guide wire spool 43 at position 51 with the upper end 52 extending outward over an opening 53 in the hull 11. Attached to the upper end 52 of the guide wire boom 44 is the guide wire measuring device 16. Shown in greater detail in FIG. 4, the guide wire measuring device 16 comprises a primary boom pulley 54, a secondary counting mechanism pulley 55, and a counting mechanism 56. Incorporated within the counting mechanism 56 is a depth indicator display 57. The guide wire measuring device 16 is affixed to the upper end 52 of the guide wire boom 44 at position 58 (shown broken away in FIG. 4).

Shown best in FIGS. 1 and 7, a guide wire 59 begins and extends from the guide wire spool 43, over the guide boom 44, around the primary boom pulley 54 and secondary counting mechanism pulley 55, and through the hull 11 opening 53. The end of the guide wire 59 is attached to the top of a guide wire breakaway clip 60. The bottom of the guide wire breakaway clip 60 is attached to a ballast line 61 which leads to a guide wire ballast 62. Although the preferred composition of the guide wire ballast 62 is lead or steel, is it to be understood that a variety of highly dense materials may be used to achieve the same desired function.

Figure 2:
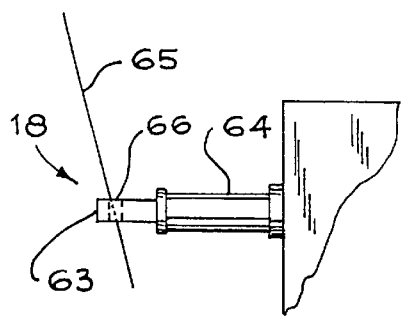
FIG. 2 is an enlarged view of the removable rear fishing line guide showing a fishing line positioned therethrough.

Shown in detail in FIG. 2, and generally in FIGS. 1 and 7, is a fishing line guide assembly 18 comprised of a guide peg 63 and a guide peg casing 64 attached to the center of stern section 34 of the hull 11. Also shown is a fishing line 65 passing through an opening 66 in the guide peg 63. The guide peg 63 is slidably received within the guide peg casing 64 in such a manner as to have an amount of friction there between causing the guide peg 63 to remain within the guide peg casing absent a force applied to remove the guide peg 63.

Referring now to the forward bow region 12 in FIGS. 1, 5, 7, and 8, there is shown a rudder assembly 17 pivotally attached to the top surface 30 of the hull 11 at position 66. This rudder assembly 17 comprises a rudder blade 67A and 67B, a rudder tiller arm 68, and a stay peg 69 sidably received in an aperture 70A and 70B within the top surface 30 of the hull 11. The rudder blade 67A and 67B is attached to the rudder tiller arm 68 by multiple screws or rivets 71. The pivot position 66 of the rudder tiller arm 68 allows the front of the rudder tiller arm 72 to rotate between a leftward position and a rightward position. (In FIGS. 1 and 7, the rudder assembly is shown in a rightward position.) The rudder blade 67A and 67B is secured in a rightward position by rotating the rudder tiller arm 68 toward the aperture 70A and placing the stay peg 69 in the aperture 70A. Conversely, the rudder blade 67A and 67B is secured in a leftward position by rotating the rudder tiller arm 68 toward the aperture 70B and placing the stay peg 69 in the aperture 70B.

Also shown in the forward bow region 12 in FIGS. 1, 5, 7, and 8, is a right towing eyelet 72 attached to the upper surface 30 of the right pontoon 35, and a left towing eyelet 73 attached to the upper surface 30 of the left pontoon 36. To tow the trolling outrigger 10 behind a moving watercraft a tow line (not shown) is attached to one of the towing eyelets 72 or 73. Which eyelet is used depends upon which side of the moving watercraft (not shown) the operator desires the trolling outrigger 10 to operate. To troll with the trolling outrigger 10 on the starboard side of a moving watercraft the tow line (not shown) is attached to the left towing eyelet 73 and the rudder assembly 17 is rotated to a rightward position and secured by the stay peg 69 in aperture 70A. Again, conversely, to troll with the trolling outrigger 10 on the port side of a moving watercraft the tow line (not shown) is attached to the right towing eyelet 72 and the rudder assembly 17 is rotated to a leftward position and secured by the stay peg 69 in aperture 70B.

Figure 8:
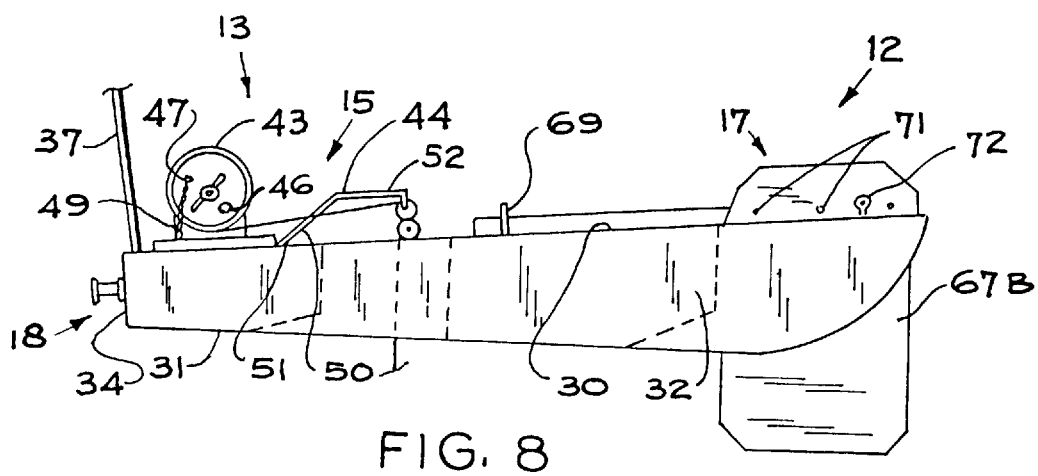
FIG. 8 is a side elevational view of the same configuration as described in FIG. 7 showing a smaller sized rudder blade than the first embodiment as described in FIG. 1.
Figure 9:
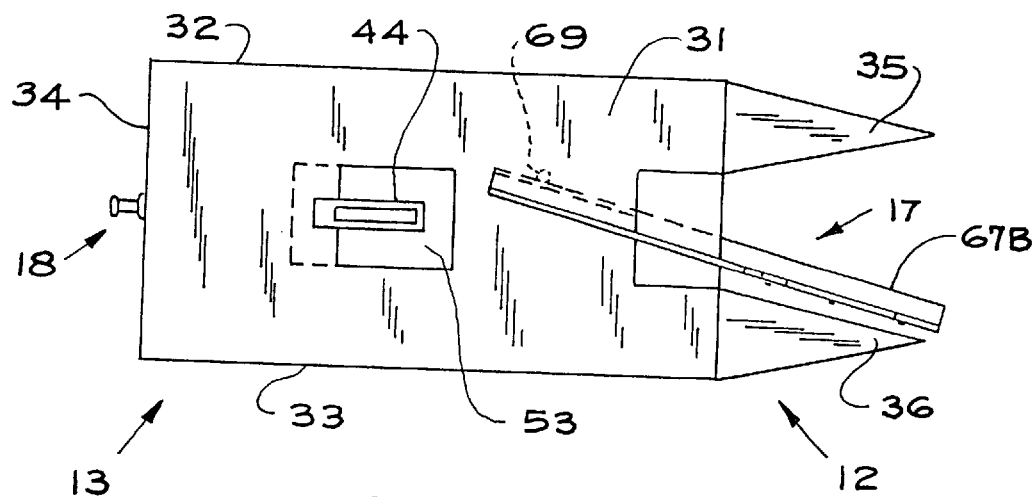
FIG. 9 is a bottom plan view of the second embodiment of the trolling outrigger.

Shown in FIGS. 7 through 9, is the second embodiment of the present invention which differs slightly from the first embodiment in its hull 11 bow 12 design. FIG. 7 shows that the second embodiment incorporates deeper right 35 and left 36 pontoons with a convex shaped leading edge 77 and 78 in the forward bow region 12 of the hull 11. In addition, the second embodiment utilizes a smaller rudder blade 67B within the rudder assembly. These deeper and convex leading edges 77 and 78, as well as the reduced surface area of the smaller rudder blade 76B, provide enhanced stability and wave cutting characteristics in choppy surface water conditions.

The trolling outrigger 10 can be used one of two manners. In preparation for use of the trolling outrigger 10 in the first manner, a standard fishing line 65, with a standard fishing lure or bait 74 attached, is placed within the guide wire breakaway clip 60 and the trolling outrigger 10 is placed in the water. The pin 47 is then removed from the guide wire spool 43 to allow a length of guide wire 59 to feed from the guide wire spool 43 and through the wire measuring device. The motion of the guide wire 59 running across the primary boom pulley 54 and through the guide wire measuring device 16 rotates the secondary counting mechanism pulley 55 of the counting mechanism. This feeding of the guide wire 59 from the guide wire spool 43 is done until the desired lure depth is shown within the depth indicator window 57. Once the guide wire 59 and fishing line 65 have both reached a desired depth as indicated by the depth indicator display 57 the pin 47 is returned into the guide wire spool 43. Finally, a section of the fishing line remaining above the guide peg 63 is secured 75 between the calipers 64 of one or more line release clasps 14 on the mast 37. The fishing line continues 76 to a standard fishing pole (not shown) or other device on the moving watercraft (not shown).

In the same manner of use, the fishing line 65 is threaded through the opening 66 in the guide peg 63 before the pin 47 is removed from the guide wire spool 43. The peg 63 is next inserted into the guide peg casing 64. As the ballast 62 is released, the fishing line passes through the opening 66 in the guide peg 63.

As described above, the trolling outrigger 10 is then released on the desired side of the watercraft (not shown) and pulled through the water by a tow line (not shown). The water flow across the appropriately positioned rudder blade 67A and 67B creates a force on the hull 11 perpendicular to the direction of the moving watercraft (not shown). This perpendicular force of the rudder assembly upon the hull 11 acts in conjunction with the parallel force of the tow line (not shown) to position the trolling outrigger 10 a distance off the side of the moving watercraft.

As the trolling outrigger 10 is towed through the water, the weight of the guide line ballast 62 cause it and the ballast line 61 to maintain a position substantially beneath the guide line boom 44. This ballast force in turn maintains the breakaway clip 60 and lure 74 at substantially the preselected depth of the depth indicator display 57. When the sudden force of a fish (not shown) striking the lure or bait 74 is transmitted to the fishing line, both the breakaway clip 60, and the guide peg 63, or the fishing line release clasps 14 each give way to the force and release the full length of the fishing line 65 from the trolling outrigger 10. In this way, the substantial forces and rapid directional changes associated with landing a caught fish into a watercraft are done untethered to any constrictions of the trolling outrigger 10.

The tow line (not shown) can then be used to retrieve the trolling outrigger 10 to reattach the same, or a new, fishing line 65 and lure 74 to the trolling outrigger as described above and used repeatedly in this manner. It is also reasonable to expect that multiple trolling outriggers of the present invention could be used simultaneously from one moving watercraft to position multiple trolling lines alongside the watercraft.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A trolling outrigger apparatus for trolling a fishing lure from a moving watercraft at a predetermined distance from the watercraft and at a specified depth, the apparatus comprising:

a sealed floating hull having a forward bow region and a rearward stern region;

a mast, the mast being attached to said hull;

at least one line release clasp, the line release clasp being attached to said mast;

a rudder; the rudder being pivotally attached to the hull;

an opening formed through said hull; and a guide wire assembly, the guide wire assembly mounted to the hull adjacent said opening.

2. The trolling outrigger apparatus of claim 1, wherein said guide wire assembly includes a guide wire having an end; and a ballast attached to the wire end.

3. The trolling outrigger apparatus of claim 1, wherein said forward bow region comprises a right pontoon and a left pontoon.

4. The trolling outrigger of claim 3, where a first eyelet is attached to the right pontoon and a second eyelet is attached to the left pontoon.

5. The trolling outrigger apparatus of claim 1, wherein said rudder assembly comprises a rudder blade and a rudder tiller arm;

the rudder blade attached to the rudder tiller arm; and the rudder tiller arm pivotally attached to the sealed floating hull.

6. The rudder assembly of claim 5, further including a stay peg and at least one stay peg aperture, the stay peg aperture being formed in the sealed floating hull.

7. The rudder assembly of claim 6, including two stay peg apertures.

8. The trolling outrigger apparatus of claim 2, wherein said guide wire assembly comprises a guide wire spool, a guide wire boom located adjacent the guide wire spool, and a guide wire measuring device located adjacent the guide wire boom.

9. The guide wire assembly of claim 8, wherein said guide wire boom has an upper and a lower end, said lower end being permanently attached to said upper surface of said hull.

10. The guide wire assembly of claim 9, wherein said guide wire boom extends over said opening through said hull, said upper end of said guide wire boom being coupled to said guide wire measuring device.

11. The guide wire measuring device of claim 10, wherein said guide wiring device comprises a guide wire boom pulley, a secondary measuring device pulley, and a counting device;

said secondary measuring device pulley being attached to said counting device; and said guide wire boom pulley being rotatably attached to said guide wire boom.

12. The trolling outrigger apparatus of claim 1, wherein said stern section has attached to its outer surface a fishing line guide assembly; said guide assembly comprising a guide peg and a peg casing; said guide casing being fixedly attached to said hull; said guide peg being slidably received therein.

13. The guide peg of claim 12, wherein said guide peg has a first end and a second end; an opening being formed through said first end; and said second end being slidably received within said peg casing.

14. The of line release clasp of claim 1, wherein said release clasp comprises a first arm, a second arm, calipers, and a coil spring.

15. The line release clasp of claim 14, wherein said first arm is hingabley attached to said second arm, said calipers being attached to said upper arm and said lower arm.

\* \* \* \* \*